Sept. 13, 1938.                J. S. STULL                 2,129,883
                        MATERIAL WORKING APPARATUS
                          Filed Oct. 10, 1935        3 Sheets-Sheet 1

INVENTOR
J. S. STULL
BY H. G. Whitehorn
ATTORNEY

Sept. 13, 1938.  J. S. STULL  2,129,883
MATERIAL WORKING APPARATUS
Filed Oct. 10, 1935   3 Sheets-Sheet 3

INVENTOR
J. S. STULL
BY H. A. Whitehorn
ATTORNEY

Patented Sept. 13, 1938

2,129,883

UNITED STATES PATENT OFFICE

2,129,883

MATERIAL WORKING APPARATUS

John S. Stull, Chicago, Ill., assignor to Western Electric Company, Incorporated, New York, N. Y., a corporation of New York Application October 10, 1935, Serial No. 44,317

4 Claims. (Cl. 90—13.05)

This invention relates to material working apparatus, and more particularly to attachments for milling machines for cutting slots or notches in articles, such as keys.

An object of this invention is to provide a simple, practical and efficient automatic material working apparatus for cutting a series of slots or notches of predetermined depth and arrangement in articles.

In accordance with the object, one embodiment of this invention, as applied to an apparatus for milling tumbler notches in key blanks, comprises an apparatus having a base adapted to be fixed to a reciprocable table of a milling machine in operative relation with a continuously rotating normally fixed axis cutter of the machine. Movably carried on the reciprocable base is a key blank holder operatively associated with means effective for automatically imparting to the holder three motions at right angles to each other upon each back and forth movement of the milling machine table, said motions being transverse to the axis of the rotary cutter for predetermining the depth of the notch, tangential to the cutter to perform the cutting operation, and parallel to the cutter axis for indexing from one notch to the next.

Other features and advantages of this invention will more fully appear from the following detailed description taken in connection with the accompanying drawings, wherein Fig. 1 is a side view, partly in section, of an apparatus embodying the features of the invention as used on a milling machine, shown fragmentarily;

Figure 1:
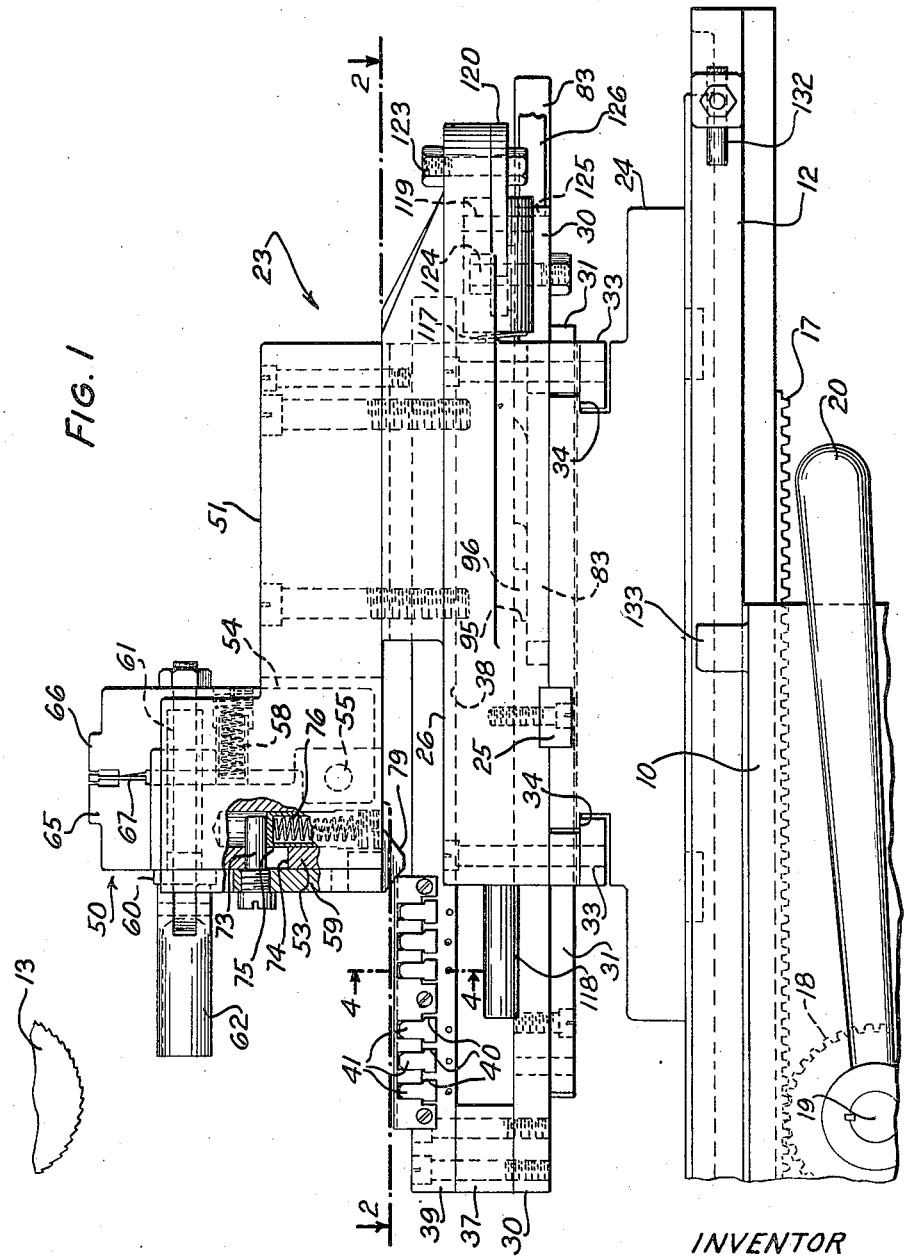
Figure 3:
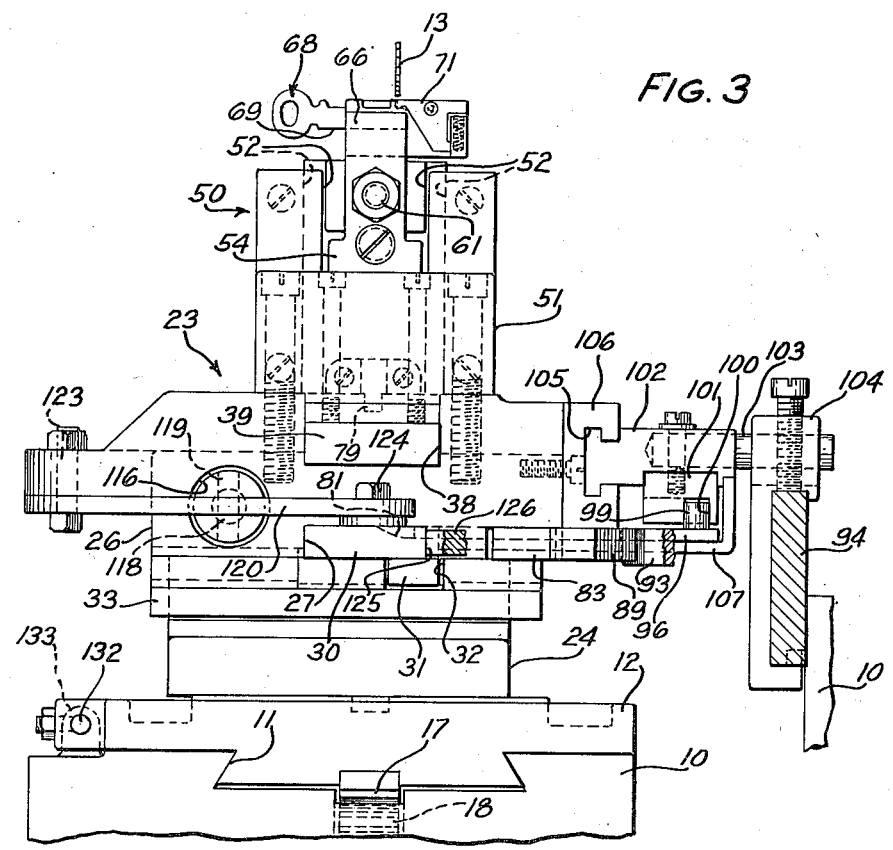
Fig. 3 is an end view partly in section, taken on the line 3—3 of Fig. 2.

Referring particularly to Figs. 1 and 3, the numeral 10 indicates a portion of a milling machine pedestal or supporting frame provided with the usual guideway 11 for a reciprocable carriage or table 12 which in the present embodiment of the invention is manually reciprocated to and from a power driven circular cutter 13 by means hereinafter described. The cutter 13 is mounted in a usual manner upon an arbor (not shown) which is rotatably journaled about a normally fixed axis disposed above the table 12 by supporting means carried by the frame 10, the supporting means being adjustably carried whereby the cutter may be accurately positioned relative to the work for a particular set up. The cutter arbor is driven continuously in a counterclockwise direction from any suitable source of power and thus constitutes means for driving the cutter 13. For manually reciprocating the table 12 it carries a rack bar 17 which meshes with a pinion 18 fixed to a shaft 19 journaled in the frame 10, the shaft carrying a hand lever 20. It will be apparent that the operator by grasping the hand lever 20 and rocking it back and forth will impart motion to the table 12 upon the frame 10 first in one direction and then in an opposite direction.

The apparatus carried by the table 12 which in cooperation with the table and the rotary cutter 13 serves to cut a series of notches of predetermined depth and arrangement in articles or, as disclosed in the present embodiment, tumbler notches in key blanks, is designated as a whole in the drawings by the reference numeral 23 and comprises a base 24 removably attached to the table 12 in a usual well known manner, not indicated. Mounted upon the base 24 for longitudinal movement therewith and having a lateral sliding motion in a right angle direction thereon by means of keys 25 is a sub-base 26 (Fig. 3), the keys being secured to the sub-base and entered in spaced keyways provided in the base 24. Having a sliding fit in a longitudinal channel 27 in the lower surface of the sub-base 26 and between the keys 25 is a ratchet bar 30 (Figs. 2 and 3) which supports from its under surface a cam member 31 comprising an angularly arranged cam bar having its vertical side surfaces engaging cam surfaces 32 of a channel formed at a similar angle in the upper surface of the base 24. Secured to the lower surface of the sub-base 26 at each end and below the cam bar 31 are locking bars 33 (Fig. 1) which slidably engage under laterally extending lips 34 of the base 24, thus preventing vertical displacement of the sub-base 26 relative to the base 24 but permitting its lateral movement thereon. Secured to the ratchet bar 30 at its left end, as indicated at 37, and having a sliding fit in a longitudinal channel 38 (Fig. 3) in the upper surface of the sub-base 26 in vertical alinement with the ratchet bar is a plate 39.

Figure 4:
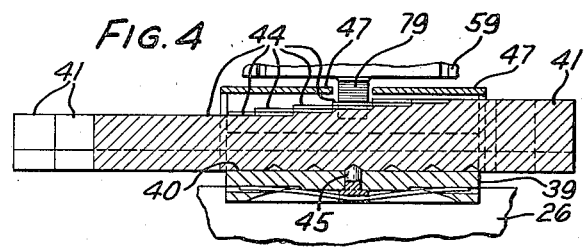
Fig. 4 is a detail vertical section on an enlarged scale, taken on the line 4—4 of Fig. 1.

Formed in the upper surface of the plate 39 at its left end are a plurality of laterally extending channels 40 (Figs. 1 and 4), which in the present embodiment number six, arranged in spaced pairs of three channels each, the channels of each pair being similarly spaced from the adjacent channel. Slidable in the channels 40 are slot or notch depth determining slides 41, one for each point or station on the key blank where a notch is to be formed, the slides all being similar in contour and provided upon their upper faces with six, in the present embodiment, steps 44 of different heights for determining the depth of cutting in the key blanks at the respective stations. The described spaced arrangement of notch depth determining slides 41 are for a particular combination of spaced parallel notches to be cut in key blanks (Fig. 5) for a certain type of six tumbler lock.

The station slides 41 are adjusted along the channels 40 to provide the particular combination of different depth notches to be milled in key blanks. This is done manually and a wire leaf spring actuated plunger 45 (Fig. 4) carried in each of the station slides 41 with its upper end shaped to engage in V-shaped notches formed in the lower surface of each of the slides, one notch being provided for each step 44 in the slide, holds the slide in its adjusted position. Each of the notch depth determining steps 44 has a numeral designation 46 (Fig. 2) to indicate its position for its respective station which may be exposed between spaced plates 47 so that the particular combination of numbered steps set up at the six stations is exposed or set out. One of the spaced plates 47 has alphabetical designations 48, one for each station slide 41, which together with the numeral designations 46 on each step 44 of the slides provide means whereby the key blanks may be cut according to a predetermined code.

Fixedly secured to the upper surface of the sub-base 26 is a key blank holding device, indicated in general by the numeral 50 (Figs. 1 and 3), comprising a frame 51 bifurcated at its left end, the furcations being provided with vertical slideways 52 on their inner opposed surfaces. Slidable on the slideways 52 as a unit is a pair of key blank clamping jaw members 53 and 54, the jaw members being hinged together as indicated at 55. A compression spring 58, carried in a pocket in the jaw member 54 and abutting at one end a surface of the jaw member 53, normally urges the members apart. An end plate 59 fixed to the frame 51 holds the jaw member 53 in sliding relation upon the frame. Extending freely through a collar 60 and the member 53 is a draw bolt 61 threaded at its right end into the member 54, the end plate 59 being cut out to permit the collar to abut the outer surface of the member 53. Pivoted to the left end of the bolt 61 is a lever 62 which is bifurcated at its inner end and formed with peripheral cam faces on the furcations thereof which are arranged to rockably engage the collar 60 at diametrically opposite points of the bolt.

The members 53 and 54 at their upper ends are formed with jaw heads 65 and 66, respectively, the head 65 carrying a spacer 67 upon its inner vertical surface. Suitable locating and stop surfaces on the heads 65 and 66, together with the spacer 67, are effective to accurately position and rigidly clamp a pair of key blanks 68, one at each side of the spacer to the members 53 and 54, when the cam lever 62 is rocked about its pivotal connection with the bolt 61, which movement draws the bolt 61 and the member 54 outwardly and toward the member 53, thereby compressing the spring 58. Upon rocking the cam lever back again the spring 58 acts to separate the members 53 and 54, thus freeing the key blanks 68 for removal. In positioning the key blanks 68 between the jaw heads 65 and 66 they are slid longitudinally upon their lower unbroken edge surfaces 69 (Fig. 5) along supporting surfaces on the heads into position at each side of the spacer 67. A spring pressed pivotal locking pawl 71 (Fig. 3) carried on each of the heads 65 and 66 engages a shouldered end surface 72 on the key blank 68 as the latter is slid into position and is effective to hold the key blank in position upon the jaw head until the cam lever 62 is actuated to draw the jaw heads 65 and 66 into clamping relation.

Fixed to the end plate 59 is a stop pin 73 (Fig. 1) which extends inwardly and through an elongated slot 74 provided in the jaw member 53, the peripheral surface at the inner end of the pin engaging the upper end surface of a spring pressed cup-shaped plunger 75 slidably carried in a vertically disposed aperture in the member 53. A spring 76 within the plunger 75 abutting at opposite ends the plunger and a plug threaded into the aperture serves to normally urge the vertically slidable jaw members 53 and 54 to their lowered position as shown in the drawings, with the upper end wall of the slot 74 abutting the stationary stop pin 73. Secured to the lower end of the jaw member 53 is a member having a cam-shaped abutment 79 depending below the end surface of the jaw member, the abutment being located centrally across the bottom of the jaw member 53 and also the space between the plates 47. As shown in the drawings the apparatus is in a normal position at the end of a cycle of notching operations with the abutment 79 to the right of the first station slide 41, the vertically slidable jaw members 53 and 54 resting on the stop pin 73. In the operation of the apparatus to be described more fully hereinafter, the abutment 79 rides onto the first preadjusted station slide 41, thus elevating the jaw members 53 and 54, and with them the key blanks 68 to the desired plane above the lower peripheral cutting edge of the fixed axis cutter 13 for cutting the first notches to a desired depth in the key blanks when the key blanks are moved tangential to the cutter in a following movement of the jaw members.

Figure 2:
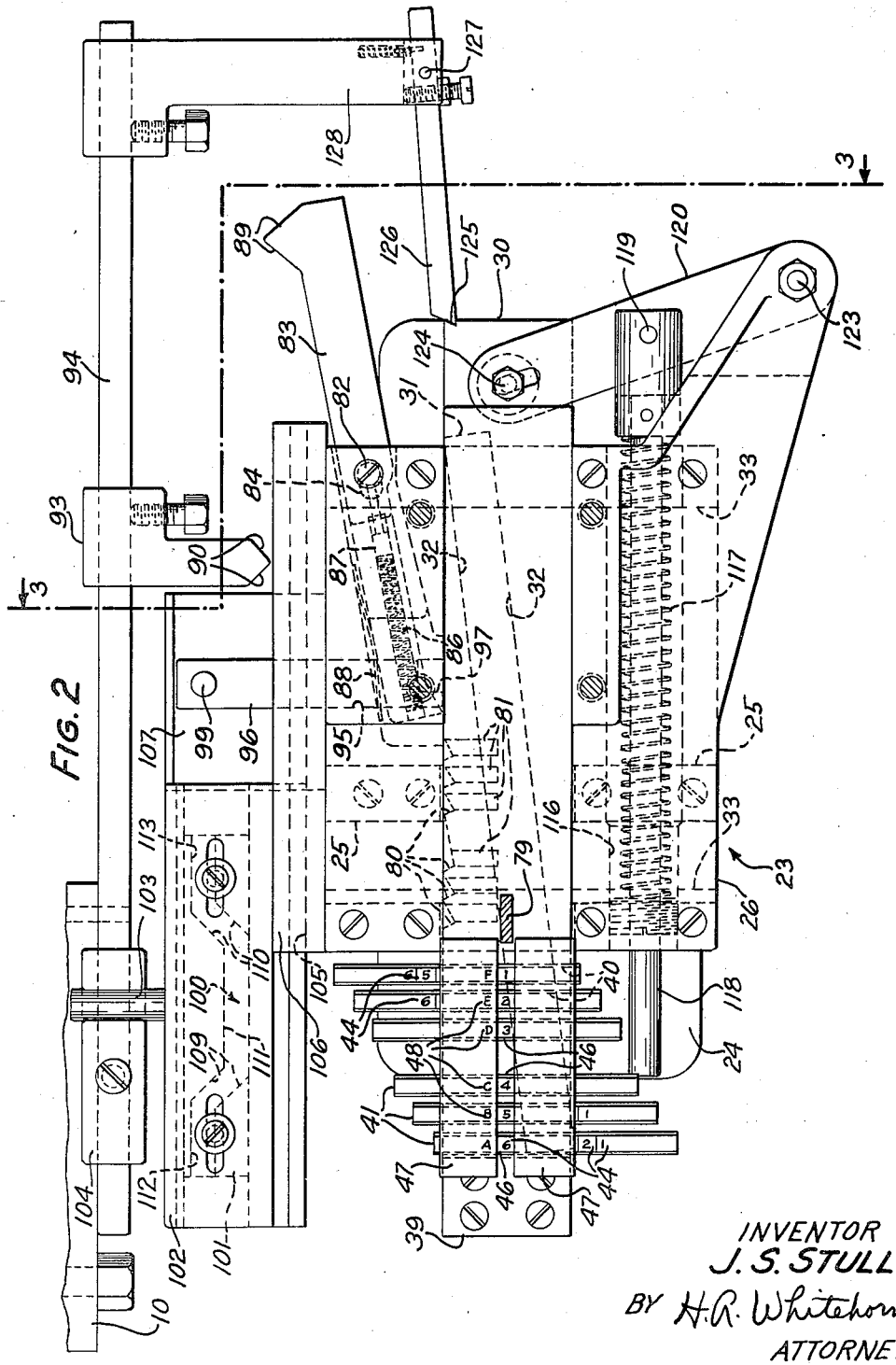
Fig. 2 is a plan section taken on the line 2—2 of Fig. 1.
Figure 5:
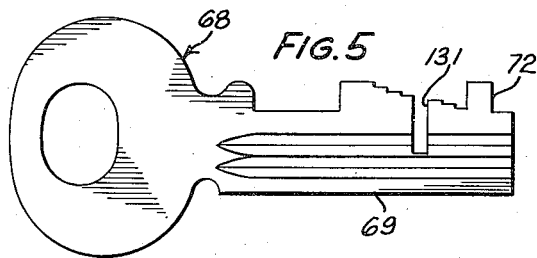
Fig. 5 is a view on an enlarged scale of a key after a plurality of tumbler notches have been cut therein by an apparatus embodying the features of this invention.

The ratchet bar 30 has formed in its upper side surface, as viewed in Fig. 2, six ratchet teeth 80 having a similar spacing as the notch depth determining slides 41, the spacing of which determines the distance between the parallel notches to the cut in the key blanks 68 (Fig. 5). Formed in the upper surface of the ratchet bar 30 are six straight sided notches 81, one notch at each of the ratchet teeth 80. Pivotally carried in a pocket formed in the sub-base 26, as indicated at 82, is a pawl 83 which through an elongated slot 84 therein, at the pivot 82, has a limited longitudinal movement relative to its pivot point. A compression spring 86 carried in an aperture in the pawl 83 and bearing at opposite ends against a plug threaded into the pawl and a plunger 87 projecting through the wall of the slot 84 and engaging the pivot 82 serves to continually urge the pawl toward the left a distance limited by the length of the slot.

As shown in Fig. 2 wherein the parts are shown in a normal position the pawl is in its extreme left position with its ratchet teeth engaging end abutting the plane side surface of the ratchet bar 30 adjacent the edge of the first tooth 80 thereof and ready to engage therein upon a movement of the ratchet bar 30 towards the right relative to the pawl 83. A leaf spring 88 carried by the pawl 83 and bearing against a wall of the pocket in the sub-base 26 constantly tends to rotate the pawl counterclockwise about its pivot 82, thus insuring the operative engagement of the pawl in one of the ratchet teeth 80 when the pawl is permitted to engage the same. At its outer end the pawl 83 (Fig. 2) is formed with oppositely arranged cam faces 89 which alternately engage similar cam faces 90 formed on a stationary lug 93 during reciprocatory movements of the milling machine table 12, which carries the apparatus 23, the lug being adjustably carried on a bar 94 fixed to the frame 12 of the milling machine. An engagement of either of the cam faces 89 of the pawl 83 with either of the cam faces 90 of the lug 93 as the pawl moves therepast, it will be apparent, will rock the pawl clockwise about its pivot 82 and draw its ratchet teeth engaging end from the engaged tooth 80 of the ratchet bar 30.

Slidable upon and laterally of the ratchet bar 30 in a guide channel 95 in the lower surface of the sub-base 26 is a locking pawl 96 (Figs. 2 and 3) which is formed, at its end adjacent the pawl 83, with a tooth 97 for engaging in the notches 81 of the ratchet bar. The engagement of the tooth 97 in one of the notches 81 serves to lock the ratchet bar 30 from movement relative to the sub-base 26 during a movement of the elevated key blanks 68 tangentially of and past the cutter to perform the cutting operation. At its opposite end the pawl 96 carries an upwardly extending pin 99 (Fig. 3) which in operation rides along a cam track 100 formed in a block 101 adjustably carried in a bracket 102. A pin 103 (Fig. 2) fixed to one side of the bracket 102 is slidably fitted in the upper notched surface of a bracket 104 secured to the bar 94 which in turn is fixed to the frame 10 of the milling machine. The bracket 104 at its opposite side is slidably supported in a channel 105 (Fig. 3) formed in a member 106 secured to the side of the reciprocable sub-base 26, the member 106 carrying on its lower surface a plate 107 which serves as a support for the pawl 96 at its end portion carrying the pin 99. The described mounting of the bracket 104 carrying the cam track block 101, it will be apparent, permits a longitudinal movement of the apparatus as a whole relative to the cam track and at the same time permits the cam track to move laterally with the apparatus since the pin 103 may slide longitudinally in the notched bracket 104.

The cam track 100 is formed with two plunger actuating portions 109 and 110 (Fig. 2), one at each end of a dwell portion 111, the portions 109 and 110 terminating in other dwell portions 112 and 113, respectively, which serve to hold the locking pawl 96 from engaging in the notches 81 of the ratchet bar 30 during a portion of each reciprocatory movement of the sub-base 26 after the key blanks 68 have been notched in their tangential movement past the cutter 13, and also while the apparatus is in its normal position as shown in the drawings.

The sub-base 26 is provided with a longitudinal bore 116 (Fig. 2) within which is a compression spring 117 surrounding a reduced portion of a plunger 118, the left end of the reduced plunger portion being slidable in a screw plug threaded into the wall of the bore. The plunger 118 is pivoted at 119 to a lever 120 which at one end is pivoted at 123 to an arm of the sub-base 26 and its opposite end is pivoted at 124 to the ratchet bar 30. The loaded spring 117 serves to move the ratchet bar 30 step by step towards the right when it is released by the withdrawal of the locking pawl tooth 97 from a notch 81 of the ratchet bar during a reciprocatory movement of the sub-base 26 in either direction. Energy is stored in the spring 117 after the last reciprocatory movement of the apparatus towards the right or upon completion of the last of the six notches cut in the key blanks 68. In the continued movement of the apparatus in the direction of its last movement the right end of the ratchet bar 30 which has a tapered notch 125 engages a tapered end of a stop member 126 yieldably pivoted at 127 to a bracket 128 secured to the bar 94, the end of the stop member entering the notch in the ratchet bar. Thereafter in the continued movement of the apparatus the ratchet bar is moved to the left upon the sub-base 26 which serves to compress the spring 117 for the next operation of the apparatus.

In the operation of this apparatus let it be assumed that a key is to be notched having the code number 123456, as shown set up between the spaced plates 47 (Fig. 2), which indicates that six notches are to be cut, each notch to have a different depth, the notches each being formed successively of lesser depth from the outer ends of the key blanks 68 inwardly. The particular key blank 68 (Fig. 5) is provided with a notch 131 which is cut in another operation previous to the cutting of the six notches, three at each side thereof about to be described. Each of the station slides 41 is therefore adjusted by sliding it laterally on the plate 39 to provide the particular combination of different depth notches, the particular numeral designation 46 indicating the depth of the notch at the particular station appearing in the space between the plates 47 and when the slide is correctly positioned the associated spring pressed plunger 45 springs into the notch on the slide and holds it thereat. Thereafter the key blanks 68 are clamped in position between the jaw heads 65 and 66, in the manner hereinbefore described, and the cutter 13 is caused to continuously rotate. It is also assumed that the apparatus 23 carried by the reciprocatory table 12 of the milling machine is in its normal position, as shown in the drawings, wherein tension has been stored in the spring 117, the ratchet bar 30 and attached parts including the base 34 and sub-base 26, holding the position shown against the action of the spring due to their inertia and the friction inherently existing between the parts. It is also to be noted that in this condition of the apparatus the locking pawl 96 and the ratchet pawl 83 have been withdrawn from the notches and teeth of the ratchet bar 30.

The table 12 is then moved toward the left by rocking the hand lever 20 fixed to the shaft 19 counterclockwise in one continuous stroke, as viewed in Fig. 1, which through the cooperating pinion 18 and rack bar 17 carried by the shaft and the table, respectively, the table and the base 24 of the apparatus 23 carried thereby are moved towards the left, its movement being limited by a stop member 132 carried by the table engaging a stop member 133 fixed to the frame 10. During the advance of the base 24 towards the left the notched end of the ratchet bar 30, which is being constantly urged by the spring 117 toward the right, remains in engagement with the yieldable pivoted stop member 126 for a short period, the plate 39 carrying the station slides 41 also remaining behind since it is fixed to the ratchet bar. This initial advance movement of the base 24, the ratchet pawl 83 advancing therewith upon the sub-base 26, permits the inner end of the spring pressed pawl to immediately ride into the first tooth 80 of the ratchet bar 30 so that as the base 24 and sub-base 26 continue their advance towards the left the ratchet bar 30 and its attached parts advance therewith, the pawl 83 moving to the right a distance limited by the length of the slot 84.

Simultaneously with this operative connection between the pawl 83 and the ratchet bar 30 the cam-shaped abutment 79 depending from the key blank holding device 50 carried on the sub-base 26 is riding toward and onto the first preadjusted station slide 41 which is set for #1 depth notch, the key blanks 68 are thus elevated to the desired plane above the lower peripheral cutting edge of the fixed axis cutter 13, which elevation governs the depth of the notches to be cut in the key blanks at the station F, the #1 depth notches being formed at the outer ends of the key blanks.

Also simultaneously with the described actuation of the pawl 83 and the elevation of the key blanks 68 effected by the movement of the base 24, which carries the laterally slidable sub-base 26, towards the left, the sub-base 26 and the parts carried thereby are moved laterally on the base 24 toward the top of the drawings in the plan view (Fig. 2), due to the angularly arranged cam faces 32 of the channel formed in the upper surface of the base 24 moving towards the left, the cam faces sliding upon the angularly arranged cam member 31 carried on the lower surface of the ratchet bar 30. This lateral indexing movement of the sub-base 26 serves to move the key blanks 68 parallel to the axis of the cutter 13, thus positioning them relative to the cutter for the first or #1 depth notch to be cut therein. After the engagement of the pawl 83 in the tooth 80 of the ratchet bar 30, and in the continued movement of the apparatus, the tooth 97 of the locking pawl 96 enters the notch 81 associated with the first tooth 80, the actuation of the pawl 96 being effected by its pin 99 riding first onto the dwell portion 113 of the cam track 100 and then down the portion 110 thereof and onto the dwell portion 111. In the continued movement of the apparatus 23 as a whole toward the left (Fig. 1) with no relative movement occuring between the parts the key blanks 68 are moved tangentially across the lower peripheral cutting edge of the cutter 13 and the #1 depth notch is formed therein at the desired point along its upper edge surface.

The movement of the apparatus continues towards the left after the cutting of the #1 notches for a slight distance after which the left cam face 89 of the ratchet pawl 83 moves into engagement with and past the right cam face 90 of the stationary lug 93, which rocks the pawl clockwise and effects a withdrawal of the pawl from the tooth 80 of the ratchet bar 30, the bar still being held by the locking pawl 96. The withdrawal of the pawl 83 permits the spring 86 to act thereon and it moves toward the left a distance limited by the length of the slot 84 and engages in the next tooth 80. Thereafter the apparatus still continuing its movement towards the left, the pin 99 of the locking pawl 96 rides up the cam track portion 109 and onto the dwell portion 112 thus withdrawing the tooth 97 of the locking pawl 96 from the notch 81. This actuation of the pawl 96 releases the ratchet bar 30 and the stored energy in the spring 117 steps the bar towards the right a distance of one tooth 80, determined by the movement which the pawl 83, still engaged in the tooth 80, may move toward the right, during which movement the spring 86 is again compressed. Simultaneously with this movement of the ratchet bar 30 towards the right the plate 39 carried thereby moves the second station slide 41, designated station E, which is set for #2 depth notch, toward and engages it under the abutment 79 of the key blank holding device 50, thus moving or in the present set up lowering the key blanks 68 to the desired plane for the cutting of the next notch. Also at this time a lateral movement of the sub-base 26 is effected similar to that described hereinbefore in connection with the cutting of the #1 notch whereby the key blanks 68 are indexed to provide the desired space between the #1 notch and the #2 notch about to be cut. Upon the above steps taking place the stop member 132 carried by the table 12 engages the stop member 133 fixed to the frame 10 which indicates to the operator that the apparatus is ready to be moved towards the right which is effected by rocking the hand lever 20 clockwise.

As the apparatus moves toward the right the pin 99 of the locking pawl 96 rides down the cam track portion 109 and onto the dwell portion 111 thereof and thus entering the tooth 97 of the pawl in the alined notch 81 of the ratchet bar 30, followed by the key blanks 68 being moved across the cutting edge of the cutter 13, the #2 depth notch in the key blanks being cut. Following the cutting operation the pawl 83 moves into engagement with and past the left cam face 90 of the stationary lug 93 and the pawl is actuated in the manner hereinbefore described, wherein it moves to the left and engages the next tooth 80. The pin 99 next rides up the cam track portion 110, thus withdrawing the pawl 96 from locking engagement with the ratchet bar 30 and in the manner described hereinbefore the ratchet bar 30 is again stepped to the right the distance of one tooth, thus positioning the third station slide, designated D, under the abutment 79 and thereby in the present set up lowering the key blanks 68 to the desired plane for the cutting of the next notch. At the same time that the key blanks 68 are adjusted vertically they are laterally moved whereby they are indexed to provide the desired space between the #2 notch and the #3 notch about to be cut.

The following notching operations, namely, Nos. 3, 4, 5 and 6, are effected in a manner similar to that described in connection with the completed notches #1 and #2 by the operator continuing to reciprocate the table 12 alternately from left to right by rocking the hand lever 20 (Fig. 1) alternately counterclockwise and clockwise, respectively, until the key blanks 68 are completely notched in accordance with the set up of the station slides 41 to provide the desired combination of different depth notches. After the last or #6 notch is cut in the final movement of the table 12 towards the right, the operator knowing when this occurs by either counting the strokes of the hand lever 20 or the number of times the outer end of the ratchet pawl 83 passes the stationary cam lug 93, and a slight continuing movement in the same direction engages the right end of the ratchet bar 30 with the yieldably pivoted stop member 126, the tapered end of the latter entering the notch 125 of the ratchet bar and the resistance offered indicates to the operator that a continuation of the stroke is required to again load or compress the spring 117. The operator, therefore, continues to move the table 12 which serves to compress the spring 117 for the next operation of the apparatus for cutting a series of notches in key blanks. During the compression of the spring 117 the ratchet bar 30 and the attached parts do not move in a longitudinal direction, although the base 24 and the sub-base 26 continue to advance with the table 12 and at the same time the sub-base with the parts carried thereby is laterally moved upon the base in a downward direction, as viewed in Fig. 2 to its normal position, due to the angular faces 32 of the base 24 riding along the similar faces on the cam member 31 carried by the longitudinally stationary ratchet bar 30. As the ratchet bar 30 is moved laterally the engaged pivoted stop member 126 follows.

During the advance of the base 24 and sub-base 26 and the loading of the spring 117 the ratchet pawl 83 carried upon the sub-base rides idly over the teeth 80 of the ratchet bar 30 to its normal position wherein it engages the side surface of the ratchet bar adjacent the edge of the first tooth 80 thereof. The apparatus is now in its normal position, as shown in Fig. 2, whereupon the operator removes the notched keys 68, preadjusts the station slides 41 to provide another combination of different depth tumbler notches, clamps a pair of key blanks in position, and proceeds as hereinbefore described to notch the same.

It will be noted that the ratchet bar 30 has a double spacing between the third and fourth ratchet teeth 80 thereof, and also a similar spacing is provided between the third and fourth station slides 41. The purpose of this arrangement is to space the two groups of three tumbler notches each, at each side of the notch 131 (Fig. 5) provided in the particular type key illustrated. In the operation of the apparatus it will be obvious that the ratchet bar 30 and the attached parts when released from the third inner tooth 80 in the right hand group thereof will be indexed two steps instead of one.

The advantages of the herein described apparatus are that it provides for an accurate and rapid cutting of tumbler notches in key blanks, and includes simple means whereby the apparatus may be readily set up for automatically forming a series of notches of predetermined depth and arrangement in accordance with a code, the total number of different combinations possible being very great, and without the use of a highly skilled operator.

Although the invention has been disclosed and described as applied to an apparatus for milling tumbler notches in key blanks for use with a particular type of lock and one that may be attached to a conventional type of milling machine, it is clear that it may have a more general application and that modifications can be made without departing from the scope of the appended claims.

What is claimed is:

1. In a key cutting machine, a cutting tool, a key blank holding element mounted for movement to bring a blank into cutting engagement with said tool, a supporting element for said holder, said elements being relatively movable both transversely to each other and toward and from each other, a plurality of slides each of graduated thickness on one of said elements, and an abutment on the other element engaging one of said slides at a time, whereby the preadjustment of the slides will predetermine the distance between said elements at a plurality of relative transverse positions of the holding element.

2. In a key cutting machine, a reciprocative carriage, a second carriage slidable laterally thereon, a key holder slidable vertically on said second carriage, a cutter above said key holder, a plate slidable longitudinally on said second carriage below said key holder, a plurality of preadjustable slides carried on and extending laterally of said plate having stepped upper surfaces cooperating with a lower surface of said key holder upon relative longitudinal movement between said plate and key holder for positioning the latter and thereby the surface of the key to be cut a desired distance above the lower edge of said cutter for determining the depth of cut in the key, and means effective during reciprocatory movements of said first carriage for automatically moving said plate longitudinally on said second carriage and the latter carriage laterally on said first carriage at predetermined intervals to present different portions of the surface of the key to be cut to said cutter and for determining the depth of cut at the different key portions.

3. In a key cutting machine, a rotary cutter, a carriage reciprocative transversely to the cutter axis, means for reciprocating said carriage, a second carriage movable with said carriage and slidable thereon parallel to the cutter axis, a key holder movable with said second carriage and vertically slidable thereon, a plate slidable on said second carriage transversely to the cutter axis, said plate and second carriage having cooperating cam surfaces whereby a movement of said plate relative to said second carriage causes a movement of said second carriage and thereby the key parallel to the axis of said cutter whereby different portions of the key are presented to the cutter, a plurality of preadjustable slides carried on and extending parallel to the axis of said cutter, said slides having a series of steps engageable with a surface of said key holder upon successive movements of said plate relative to said carriage for causing vertical movements of the key in accordance with the particular step engaged, thereby determining the depth of cut at the different key portions, and means effective during reciprocatory movements of said first carriage wherein the key is moved tangentially across the cutter to perform the cutting operation for automatically moving said plate on said second carriage at predetermined intervals to effect said movement of the key parallel to the axis of said cutter and said vertical movement of the key.

4. In a key cutting machine, a rotary cutter, a carriage reciprocative transversely to the cutter axis, means for reciprocating said carriage, a second carriage movable with said carriage and slidable thereon parallel to the cutter axis, a key holder movable with said second carriage and vertically slidable thereon, a plate slidable on said second carriage transversely to the cutter axis, said plate and second carriage having cooperating cam surfaces whereby a movement of said plate relative to said second carriage causes a movement of said second carriage and thereby the key parallel to the axis of said cutter whereby different portions of the key are presented to the cutter, and means effective during reciprocatory movements of said first carriage wherein the key is moved tangentially across the cutter to perform the cutting operation for automatically moving said plate on said second carriage at predetermined intervals to effect said movement of the key parallel to the axis of said cutter and said vertical movement of the key for determining the depth of cut at the different key portions.

JOHN S. STULL.